United States Patent
Corrigan (10) Patent No.: US 7,670,543 B2
(45) Date of Patent: Mar. 2, 2010

(54) METHOD OF FORMING MICROSTRUCTURES WITH A TEMPLATE

(75) Inventor: Thomas R.J. Corrigan, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1234 days.

(21) Appl. No.: 11/203,908

(22) Filed: Aug. 15, 2005

(65) Prior Publication Data

US 2006/0043647 A1  Mar. 2, 2006

Related U.S. Application Data

(60) Provisional application No. 60/604,557, filed on Aug. 26, 2004.

(51) Int. Cl.
*B29C 35/08* (2006.01)
(52) U.S. Cl. .................................. 264/494; 264/496
(58) Field of Classification Search .............. 264/430, 264/434, 479, 494, 496, 614, 636, 259
See application file for complete search history.

(56) References Cited

U.S. PATENT DOCUMENTS

| | | | |
|---|---|---|---|
| 5,853,446 A | 12/1998 | Carre et al. |
| 5,980,347 A | 11/1999 | Udagawa et al. |
| 5,992,320 A | 11/1999 | Kosaka et al. |
| 6,207,268 B1 | 3/2001 | Kosaka et al. |
| 6,210,514 B1 | 4/2001 | Cheung et al. |
| 6,247,986 B1 | 6/2001 | Chiu et al. |
| 6,306,948 B1 | 10/2001 | Yokoyama et al. |
| 6,325,610 B2 | 12/2001 | Chiu et al. |
| 6,352,763 B1 | 3/2002 | Dillon et al. |
| 6,450,850 B1 | 9/2002 | Nunomura |
| 6,485,596 B1 | 11/2002 | Toyoda et al. |
| 6,527,606 B1 | 3/2003 | Baret et al. |
| 6,560,997 B2 | 5/2003 | Themont et al. |
| 6,616,887 B2 | 9/2003 | Chiu et al. |
| 6,632,116 B2 | 10/2003 | Watanabe et al. |
| 6,699,927 B2 | 3/2004 | Yokoyama et al. |
| 6,713,526 B2 | 3/2004 | Dillon et al. |
| 6,761,607 B2 | 7/2004 | Kikuchi et al. |
| 6,800,166 B2 | 10/2004 | Kosaka et al. |
| 6,802,754 B2 | 10/2004 | Chiu et al. |
| 6,821,178 B2 | 11/2004 | Sugimoto et al. |
| 6,843,952 B1 | 1/2005 | Yokoyama |
| 6,878,333 B1 | 4/2005 | Yokoyma et al. |
| 2002/0035183 A1 | 3/2002 | Yamashita et al. |

(Continued)

FOREIGN PATENT DOCUMENTS

EP  1082641  11/2002

(Continued)

OTHER PUBLICATIONS

Pending U.S. Appl. No. 11/185,097, filed Jul. 20, 2005.

(Continued)

*Primary Examiner*—Carlos Lopez
(74) *Attorney, Agent, or Firm*—Carolyn A. Fischer (57) ABSTRACT

A method of making a microstructured article such as barrier ribs for a display panel is described. The method employs a template to provide a discrete coating of a curable material.

20 Claims, 2 Drawing Sheets

U.S. PATENT DOCUMENTS

| | | |
|---|---|---|
| 2002/0102411 A1 | 8/2002 | Dillon et al. |
| 2002/0174683 A1 | 11/2002 | LaBorde et al. |
| 2003/0022585 A1 | 1/2003 | Kikuchi et al. |
| 2003/0098528 A1 | 5/2003 | Chiu et al. |
| 2003/0100192 A1 | 5/2003 | Chiu |
| 2004/0166760 A1 | 8/2004 | Kikuchi et al. |
| 2005/0029942 A1 | 2/2005 | Chiu et al. |
| 2005/0093202 A1 | 5/2005 | Yokoyama et al. |
| 2006/0087055 A1 | 4/2006 | Chiu |
| 2009/0008529 A1 | 1/2009 | Sugimoto et al. |

FOREIGN PATENT DOCUMENTS

| | | |
|---|---|---|
| JP | 2003-23026 | 11/2000 |
| JP | 2002-025431 | 1/2002 |
| KR | 2003-0059702 | 10/2003 |
| WO | WO 2004/007166 | 1/2004 |
| WO | WO 2004/010452 | 1/2004 |
| WO | WO 2004/043664 | 5/2004 |
| WO | WO 2004/062870 | 7/2004 |
| WO | WO 2004/064104 | 7/2004 |
| WO | WO 2005/013308 | 2/2005 |
| WO | WO 2005/019934 | 3/2005 |
| WO | WO 2005/021260 | 3/2005 |
| WO | WO 2005/052974 | 6/2005 |
| WO | WO 2005/068148 | 7/2005 |

OTHER PUBLICATIONS

Pending U.S. Appl. No. 11/107,554, filed Apr. 15, 2005.
Pending U.S. Appl. No. 11/185,194, filed Jul. 20, 2005.
Pending U.S. Appl. No. 11/107,608, filed Apr. 15, 2005.

METHOD OF FORMING MICROSTRUCTURES WITH A TEMPLATE

RELATED APPLICATIONS

This application claims priority to Provisional Patent Application Ser. No. 60/604557, filed Aug. 26, 2004.

BACKGROUND

Advancements in display technology, including the development of plasma display panels (PDPs) and plasma addressed liquid crystal (PALC) displays, have led to an interest in forming electrically-insulating ceramic barrier ribs on glass substrates. The ceramic barrier ribs separate cells in which an inert gas can be excited by an electric field applied between opposing electrodes. The gas discharge emits ultraviolet (UV) radiation within the cell. In the case of PDPs, the interior of the cell is coated with a phosphor that gives off red, green, or blue visible light when excited by UV radiation. The size of the cells determines the size of the picture elements (pixels) in the display. PDPs and PALC displays can be used, for example, as the displays for high definition televisions (HDTV) or other digital electronic display devices.

One way in which ceramic barrier ribs can be formed on glass substrates is by direct molding. This has involved laminating a planar rigid mold onto a substrate with a glass- or ceramic-forming composition disposed therebetween. The glass- or ceramic-forming composition is then solidified and the mold is removed. Finally, the barrier ribs are fused or sintered by firing at a temperature of about 550° C. to about 1600° C. The glass- or ceramic-forming composition has micrometer-sized particles of glass frit dispersed in an organic binder. The use of an organic binder allows barrier ribs to be solidified in a green state so that firing fuses the glass particles in position on the substrate.

Although various methods of making microstructures such as barrier ribs have been described, industry would find advantage in alternative methods.

SUMMARY OF THE INVENTION

A method of making a microstructured article such as barrier ribs for a display panel is described. The method employs a template to provide a discrete coating of a curable material. The method comprising providing a substrate and a mold having a microstructured surface (e.g. suitable for making barrier ribs);

disposing a template having at least one opening on the substrate or on the microstructured surface of the mold;

dispensing a curable (e.g. ceramic paste) material in at least each opening;

removing the template forming at least one discrete coating of ceramic paste;

contacting the discrete coating of curable material with the mold or the substrate such the curable material is disposed between the microstructured surface of the mold and the substrate; and curing the curable material.

The template can alternatively be removed after contacting the mold to the discrete coating or after curing the curable (e.g. ceramic paste) material. Preferably, the template has two or more openings. Each opening may have dimensions corresponding to a single (e.g. plasma) display panel. Each opening may have an area ranging from about 1 cm² to about 2 m². The opening in the template may have a fixed dimension or the template dimensions may be adjustable. The template may comprise an assembly of two or more discrete pieces or a first template disposed over a second template. The template may have a thickness substantially equal to the height of the microstructures (e.g. barrier ribs) a thickness substantially equal to the height of the barrier ribs in combination with a land layer. The template may optionally have a thickness of less than 50 microns at least at the peripheral edges of the opening. The template, the mold, or a combination thereof may have edge portions suitable for creating a score line in the cured ceramic paste.

The curable ceramic paste may be dispensed by means of coating substantially the entire template or by means of coating discrete areas slightly larger than each opening.

In one aspect, the substrate may be a transfer sheet. Prior to contacting the curable (e.g. ceramic paste) material with the mold, the discrete coating of ceramic paste may be transferred by for example contacting the exposed surface of the coating to a glass substrate and removing the transfer sheet. The transfer sheet may comprise a flexible film and a rigid support layer. The flexible film may be removed concurrently with removing the rigid support layer.

The mold is optionally transparent. The curable (e.g. ceramic paste) may be cured through the mold. The mold is typically flexible. The substrate may be a glass sheet optionally having patterned electrodes. The mold may be discrete, corresponding in dimension to a single display panel.

DETAILED DESCRIPTION OF PREFERRED EMBODIMENTS

The present invention is believed to be applicable to methods of making microstructures on a substrate using a mold, as well as the articles made using the methods. In particular, the present invention is directed to making inorganic (e.g. ceramic) microstructures on a substrate using a mold. Plasma display panels (PDPs) can be formed using the methods and provide a useful illustration of the methods. It will be recognized that other devices and articles can be formed using these methods including, for example, electrophoresis plates with capillary channels and lighting applications. In particular, devices and articles that can utilize molded ceramic microstructures can be formed using the methods described herein. While the present invention is not so limited, an appreciation of various aspects of the invention will be gained through a discussion of the examples provided below.

Figure 1:
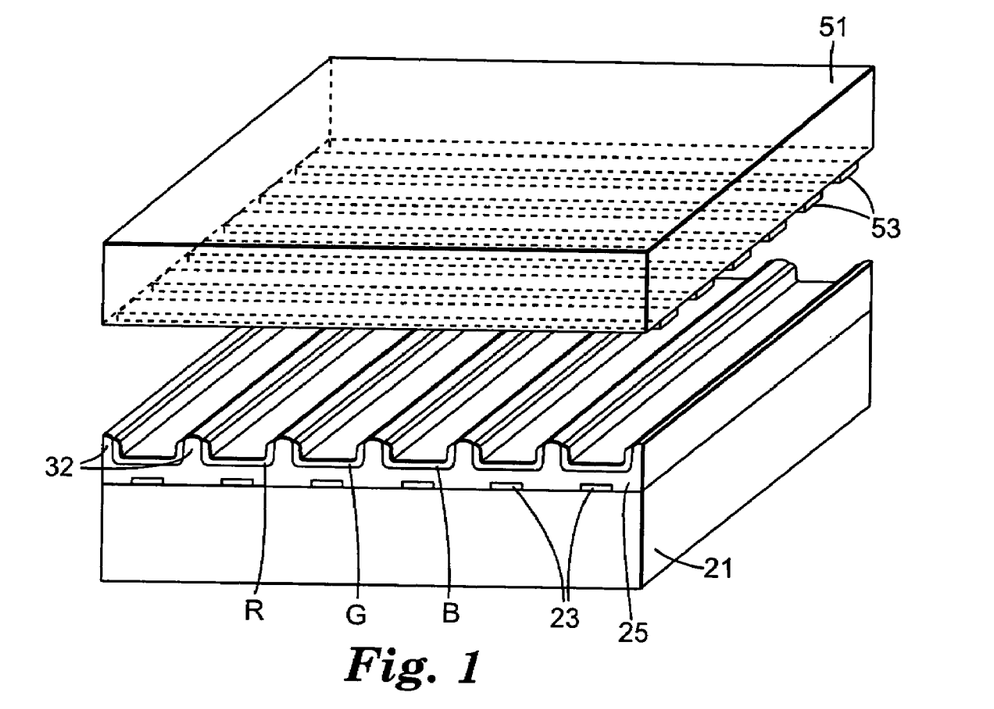
FIG. 1 is a schematic representation of an illustrative plasma display panel.

Plasma display panels (PDPs) have various components, as illustrated in FIG. 1. The back substrate, oriented away from the viewer, has independently addressable parallel electrodes 23. The back substrate 21 can be formed from a variety of compositions, for example, glass. Ceramic microstructures 25 are formed on the back substrate 21 and include barrier rib portions 32 that are positioned between electrodes 23 and separate areas in which red (R), green (G), and blue (B) phosphors are deposited. The front substrate 51 is typically a glass substrate that includes a set of independently addressable parallel electrodes 53. These front electrodes 53, also called sustain electrodes, are oriented perpendicular to the back electrodes 23, also referred to as address electrodes. In a completed display, the area between the front and back substrate elements is filled with an inert gas. To light up a pixel, an electric field is applied between crossed sustain 53 and address electrodes 23 with enough strength to excite the inert gas atoms therebetween. The excited inert gas atoms emit ultraviolet (UV) radiation that causes the phosphor to emit red, green, or blue visible light.

Back substrate 21 is preferably a transparent glass substrate. Typically, for PDP applications back substrate 21 is made of soda lime glass that is optionally substantially free of alkali metals. The temperatures reached during processing can cause migration of the electrode material in the presence of alkali metal in the substrate. This migration can result in conductive pathways between electrodes, thereby shorting out adjacent electrodes or causing undesirable electrical interference between electrodes known as "crosstalk." Front substrate 51 is typically a transparent glass substrate which preferably has the same or about the same coefficient of thermal expansion as that of the back substrate 21.

Electrodes 23, 53 are strips of conductive material. The electrodes 23 are formed of a conductive material such as, for example, copper, aluminum, or a silver-containing conductive frit. The electrodes can also be a transparent conductive material, such as indium tin oxide, especially in cases where it is desirable to have a transparent display panel. The electrodes are patterned on back substrate 21 and front substrate 51. For example, the electrodes can be formed as parallel strips spaced about 120 μm to 360 μm apart, having widths of about 50 μm to 75 μm, thicknesses of about 2 μm to 15 μm, and lengths that span the entire active display area which can range from a few centimeters to several tens of centimeters. In some instances the widths of the electrodes 23, 53 can be narrower than 50 μm or wider than 75 μm, depending on the architecture of the microstructures 25.

The height, pitch and width of the microstructured barrier ribs portions 32 in PDPs can vary depending on the desired finished article. The pitch (number per unit length) of the barrier ribs preferably matches the pitch of the electrodes. The height of the barrier ribs is generally at least 100 μm and typically at least 150 μm. Further, the height is typically no greater than 500 μm and typically less than 300 μm. The pitch of the barrier rib pattern may be different in the longitudinal direction in comparison to the transverse direction. The pitch is generally at least 100 μm and typically at least 200 μm. The pitch is typically no greater than 600 μm and typically less than 400 μm. The width of the barrier rib pattern may be different between the upper surface and the lower surface, particularly when the barrier ribs thus formed are tapered. The width is generally at least 10 μm, and typically at least 50 μm. Further, the width is generally no greater than 100 μm and typically less than 80 μm.

When using the methods of the present invention to make microstructures on a substrate (such as barrier ribs for a PDP), the coating material from which the microstructures are formed is preferably a slurry or paste containing a mixture of at least three components. The first component is a glass or ceramic forming particulate inorganic material (e.g. a ceramic powder.) Generally, the particulate inorganic of the slurry or paste is ultimately fused or sintered by firing to form microstructures having desired physical properties adhered to the patterned substrate. The second component is a binder (e.g., a fugitive binder) that is capable of being shaped and subsequently hardened by curing or cooling. The binder allows the slurry or paste to be shaped into semi-rigid green state microstructures that are adhered to the substrate. The third component is a diluent that can promote release from the mold after alignment and hardening of the binder material, and can promote fast and complete burn out of the binder during debinding before firing the inorganic material of the microstructures. The diluent preferably remains a liquid after the binder is hardened so that the diluent phase-separates from the binder during binder hardening. The slurry preferably has a viscosity of less than 20,000 cps and more preferably less than 5,000 cps to uniformly fill all the microstructured groove portions of the flexible mold without entrapping air.

The amount of curable organic binder in the curable paste composition is typically at least 2 wt-%, more typically at least 5 wt-%, and more typically at least 10 wt-%. The amount of diluent in the rib precursor composition is typically at least 2 wt-%, more typically at least 5 wt-%, and more typically at least 10 wt-%. The totality of the organic components is typically at least 10 wt-%, at least 15 wt-%, or at least 20 wt-%. Further, the totality of the organic compounds is typically no greater than 50 wt-%. The amount of inorganic particulate material is typically at least 40 wt-%, at least 50 wt-%, or at least 60 wt-%. The amount of inorganic particulate material is no greater than 95 wt-%. The amount of additive is generally less than 10 wt-%.

The method of making barrier ribs of the present invention employs a template having at least one opening. The template is employed to provide a discrete coating. Each opening of the template typically has a length and width corresponding in size to a single plasma display panel (e.g. from about 1 $cm^2$ to about 2 $m^2$). When the method is employed to make barrier ribs for plasma display panel (PDP), the substrate is typically a glass substrate (e.g. having electrodes). However, for embodiments wherein the method is conducted in reverse order, the template will be provided on the mold, rather than the glass substrate.

The template is preferably a nominally thin structure with openings that allows curable material (e.g. slurry or paste) to be provided in discrete regions on the substrate. The design or shape of the template will vary depending on the intended end use. Typically the template will be largely planar, having a thin, flat cross section. Although, the thickness will vary depending on the material(s) from which it was constructed, typically the thickness of the template is at least 10 mils, and no greater than about 0.5 inches (1.25 cm).

The template may be comprised of various plastic and metal materials. The template may also be a composite such as a laminate or both fiber-reinforced plastic and metal. Suitable materials include for example polyethylene terephthalate or polycarbonate films and other films having good tensile strength. Other useful substrates include, cellulose acetate butyrate, cellulose acetate propionate, polyether sulfone, polymethyl methacrylate, polyurethane, polyester, polyvinyl chloride, polyimide, polyolefins, polypropylene, polyethylene, and polycyclo-olefins. For embodiments wherein the template is not removed until after the inorganic material is cured, the template is preferably made from a polymeric material with high heat resistance and good release properties such as silicone rubber and polytetrafluoroethylene. Various masks for photolithographic processes can be used as templates provided the masks are provided at an appropriate thickness.

The template is typically sufficiently rigid to facilitate handling. For example the template may have a stiffness greater than E*t=500 kN/m. The template may be substantially inflexible. Alternatively, the rigid support may allow some degree of bending in at least one direction and thus is suitable for placement on a non-planar surface, such as a cylindrical roll.

The template can conveniently be provided as a single sheet, two or more sheets, or in one or more continuous rolls.

Figure 2:
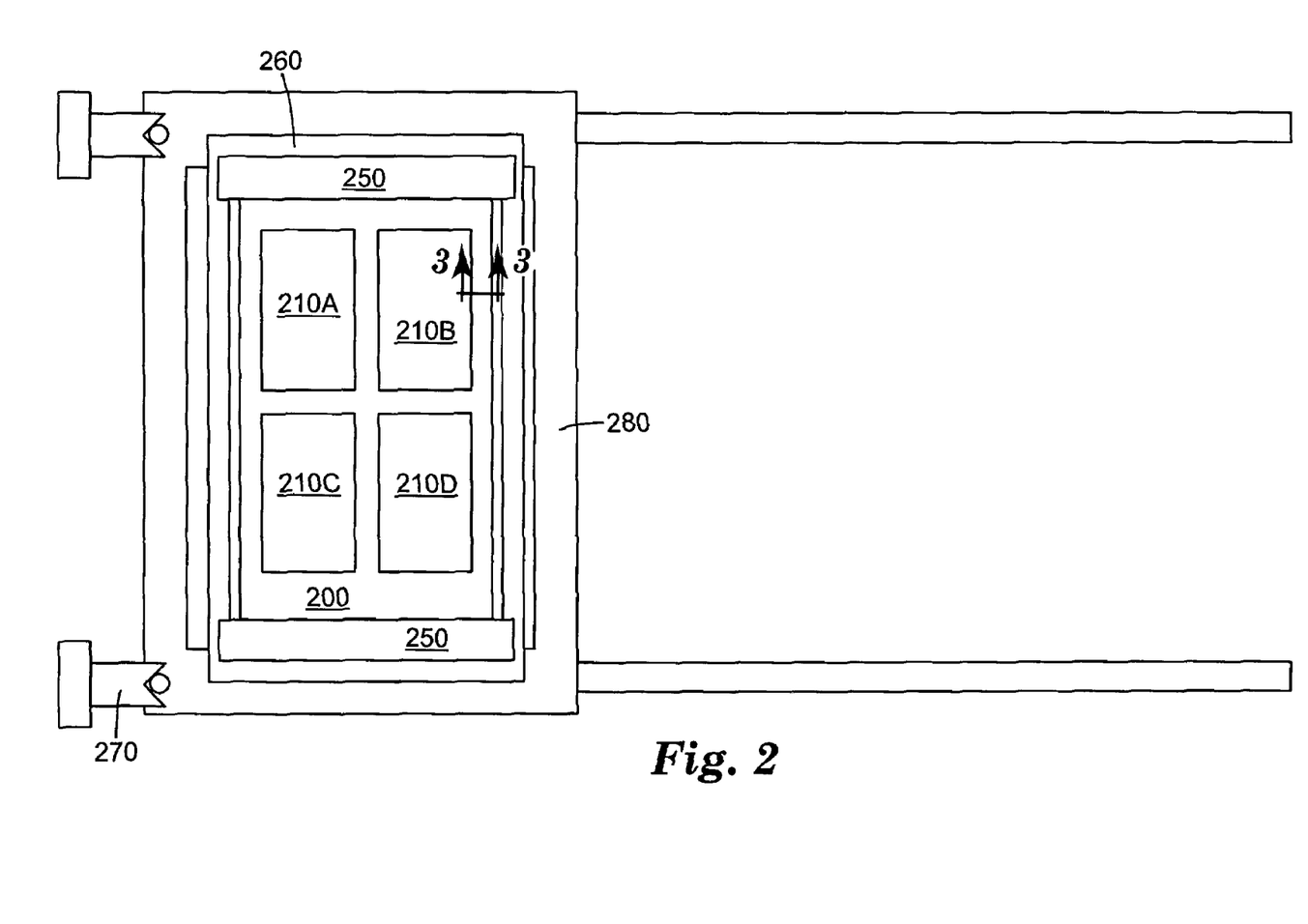
FIG. 2 is a planar view of a template in a moveable structure.

A single discrete (i.e. separate, individual) template may be provided having a single or multiple openings. FIG. 2 for example, depicts template 200 having four openings, 210A-210D. Alternatively, multiple templates may be provided, each template having a single or multiple openings.

The template may be produced from a number of separate sheets. In the case where there is a small gap between electrode patterned regions and the patterned regions are very large, the separate sheets forming the template may be narrow strips of film on independent rolls that are laid across the glass substrate to create a template having an opening(s) of the desired size. The regions of film that form the template may be discarded after each use.

The surface of template may be modified to control wetting, release characteristics and adhesion characteristic with the curable material. For example at least one surface of the template may be roughened or treated. Such roughening and/or treatment aids in maintaining the curable material on the template surface. The surface of the template may be modified by other means as well including surface coating, microstructuring and/or plasma treatment.

Once the template has been disposed on the (e.g. glass) substrate, one or more edges of the template can hold the template in place on the substrate by various suitable means. For example, one or more of the edges of the template(s) may be held by clamps, nips on rollers, or mechanical fasteners to a supporting member.

With reference to FIG. 2, clamping bars 250 may hold two opposing edges of the template. These bars are mounted in a structure 260 that maintains some tension in the template and is moveable within fixture 280 with an accuracy of +/−5 micron over a small range (+/−2 mm). The fixture 280 holding the structure 260 is moveable in 3 axes (planar X, Y, and θ) typically with an accuracy of ±250μ over a small range (±50 mm and ±20°). The fixture is moveable in one axis by a large range positioning system with a lower accuracy (±10 mm) over a greater range of motion (1.5 m or 2.5 m). The fixture is additionally moveable in the vertical axis (Z) for a small range of motion (50 mm) with control of the force exerted. The large range of motion can be produced with pneumatic, hydraulic, or ball screw transmission drives guided by linear ball bearing guides. The accurate motion can be produced with three servomotors controlling the three degrees of freedom. The servomotors can be mounted on the large range motion system that is stabilized against a repeatable hard stop 270. The three servomotors then control the fine position motion of the clamping bars that hold the template. The vertical motion can be created with pneumatic actuators with controlled pressure regulators to adjust the force.

The template is kept in close contact with the (e.g. glass) substrate at least at the peripheral edges of the opening. This can be accomplished by for example pulling the template to the surface of the substrate with vacuum, electrostatics, or an adhesive. The template optionally may be sculpted so it contacts the substrate only at the edges of the template (e.g. and is recessed throughout the remainder of the template such that the substrate and remainder of the template are not in contact.) The edges of the template that make contact with the substrate (i.e. the peripheral edges of the openings(s)) may be tapered, for example to a thickness of less than 20μ, such as depicted in the cross-sectional view of the template depicted in FIG. 3. Tapering aids in preventing the formation of thick edges that may introduce variations in thickness of the curable material coating. Further, the peripheral edges of the template and/or the mold outside of the barrier rib structured may have edge portions suitable for creating a scored line in the cured inorganic paste. The edges may be sharp or flat, continuous or serrated. The cured slurry can break preferentially at the scored lines created by the edges of the template and/or mold.

The curable material (e.g. slurry or paste) may be coated across substantially the entire surface of the template, covering at least the opening in the template. Preferably, at least an area slightly larger than each opening in the template is coated to ensure that any leading, trailing or edge defects in the coating exist only on the template and not within the opening (s).

Various coating methods can be employed to coat the curable material onto the template. Suitable methods include knife coating, gravure coating, Mayer bar coating, curtain coating or any other techniques designed to accurately control the thickness of a coating. Suitable methods are capable of coating the curable material to an accurate thickness over a wide area. For example, the template may be coated with conventional slot die coating equipment, such as commercially available systems by FAS Technologies, LLC Dallas, Tex. For improved efficiencies in manufacturing, large areas are coated that include multiple (e.g. panel) openings as well as the template surrounding the (e.g. panel) openings. Regardless of the manner employed, the slurry in coated in a manner that minimizes the entrapments of air.

The coating technique may make contact with the template and use the thickness of the template as a fixed gap to help control the thickness of the coating. The excess curable material may be removed from the top of the template after the template is moved from the substrate. For example, the template may be conveyed under a wiping bar or through a wiping nip that scrapes the slurry off. The template may be cleaned with a solution that washes the slurry from its surface. The template may then be dried before reuse. Alternatively, a vacuum system may pull the slurry off the template.

Alternatively, the template can be moved away from the substrate, taking the excess slurry with it. The template can be removed from the coated substrate with various techniques. One suitable technique is peeling away the template from the substrate in a single direction. Another technique involves releasing the force that holds the template to the substrate and pulling the template substantially vertical to prevent any dripping of the curable material from the template. Another technique employs moving a rigid plate under the template using the leading edge of the plate to pull the template away from the substrate surface in a line, while keeping the surface of the template substantially horizontal and creating a barrier between the template and the substrate. Another technique involves removing different portions of the template at different times. If the template is comprised of separate thin strips of film, then each of these films could be rolled up taking the slurry with it.

In one aspect, discrete coatings of slurry can be disposed onto a transfer sheet as further described in U.S. Provisional Patent Application Attorney Docket No. 60/604558, filed Aug. 26, 2004 and concurrently filed U.S. Patent Application Attorney Docket No. 60106US003.

The template can be removed prior to or after curing. For embodiments wherein the slurry is cured through the substrate, an opaque template can also serve as a photomask, preventing the slurry on the template from curing.

The glass or ceramic forming particulate material is chosen based on the end application of the microstructures and the properties of the substrate to which the microstructures will be adhered. One consideration is the coefficient of thermal expansion (CTE) of the substrate material. Preferably, the CTE of the inorganic material of the slurry, when fired, differs from the CTE of the substrate material by no more than about 10%. When the substrate material has a CTE which is much less than or much greater than the CTE of the inorganic material of the microstructures, the microstructures can warp, crack, fracture, shift position, or completely break off from the substrate during processing or use. Further, the substrate can warp due to a high difference in CTE between the substrate and the inorganic microstructures.

The substrate is typically able to withstand the temperatures necessary to process the inorganic material of the slurry or paste. Glass or ceramic materials suitable for use in the slurry or paste preferably have softening temperatures of about 600° C. or less, and usually in the range of about 400° C. to 600° C. Thus, a preferred choice for the substrate is a glass, ceramic, metal, or other rigid material that has a softening temperature higher than that of the inorganic material of the slurry. Preferably, the substrate has a softening temperature that is higher than the temperature at which the microstructures are to be fired. If the material will not be fired, the substrate can also be made of materials, such as plastics. Inorganic materials suitable for use in the slurry or paste preferably have coefficients of thermal expansion of about $5 \times 10^{-6}$/°C. to $13 \times 10^{-6}$/°C. Thus, the substrate preferably has a CTE approximately in this range as well.

Choosing a inorganic material having a low softening temperature allows the use of a substrate also having a relatively low softening temperature. In the case of glass substrates, soda lime float glass having low softening temperatures is typically less expensive than glass having higher softening temperatures. Thus, the use of a low softening temperature inorganic material can allow the use of a less expensive glass substrate. The ability to fire green state barrier ribs at lower temperatures can reduce the thermal expansion and the amount of stress relief required during heating, thus avoiding undue substrate distortion, barrier rib warping, and barrier rib delamination.

Lower softening temperature ceramic materials can be obtained by incorporating certain amounts of alkali metals, lead, or bismuth into the material. However, for PDP barrier ribs, the presence of alkali metals in the microstructured barriers can cause material from the electrodes to migrate across the substrate during elevated temperature processing. The diffusion of electrode material can cause interference, or "crosstalk", as well as shorts between adjacent electrodes, degrading device performance. Thus, for PDP applications, the ceramic powder of the slurry is preferably substantially free of alkali metal. When the incorporation of lead or bismuth is employed, low softening temperature ceramic material can be obtained using phosphate or $B_2O_3$-containing compositions. One such composition includes ZnO and $B_2O_3$. Another such composition includes BaO and $B_2O_3$. Another such composition includes ZnO, BaO, and $B_2O_3$. Another such composition includes $La_2O_3$ and $B_2O_3$. Another such composition includes $Al_2O_3$, ZnO, and $P_2O_5$.

Other fully soluble, insoluble, or partially soluble components can be incorporated into the ceramic material of the slurry to attain or modify various properties. For example, $Al_2O_3$ or $La_2O_3$ can be added to increase chemical durability of the composition and decrease corrosion. MgO can be added to increase the glass transition temperature or to increase the CTE of the composition. $TiO_2$ can be added to give the ceramic material a higher degree of optical opacity, whiteness, and reflectivity. Other components or metal oxides can be added to modify and tailor other properties of the ceramic material such as the CTE, softening temperature, optical properties, physical properties such as brittleness, and so on.

Other means of preparing a composition that can be fired at relatively low temperatures include coating core particles in the composition with a layer of low temperature fusing material. Examples of suitable core particles include $ZrO_2$, $Al_2O_3$, $ZrO_2$—$SiO_2$, and $TiO_2$. Examples of suitable low fusing temperature coating materials include $B_2O_3$, $P_2O_5$, and glasses based on one or more of $B_2O_3$, $P_2O_5$, and $SiO_2$. These coatings can be applied by various methods. A preferred method is a sol-gel process in which the core particles are dispersed in a wet chemical precursor of the coating material. The mixture is then dried and comminuted (if necessary) to separate the coated particles. These particles can be dispersed in the glass or ceramic powder of the slurry or paste or can be used by themselves for the glass powder of the slurry or paste.

The glass or ceramic forming material of the slurry or paste is preferably provided in the form of particles that are dispersed throughout the slurry or paste. The preferred size of the particles depends on the size of the microstructures to be formed and aligned on the patterned substrate. Preferably, the average size, or diameter, of the particles in the inorganic material of the slurry or paste is no larger than about 10% to 15% the size of the smallest characteristic dimension of interest of the microstructures to be formed and aligned. For example, PDP barrier ribs can have widths of about 20 μm, and their widths are the smallest feature dimension of interest. For PDP barrier ribs of this size, the average particle size in the inorganic material is preferably no larger than about 2 or 3 μm. By using particles of this size or smaller, it is more likely that the microstructures will be replicated with the desired fidelity and that the surfaces of the inorganic microstructures will be relatively smooth. As the average particle size approaches the size of the microstructures, the slurry or paste containing the particles may no longer conform to the microstructured profile. In addition, the maximum surface roughness can vary based in part on the inorganic particle size. Thus, it is easier to form smoother structures using smaller particles.

The binder of the slurry or paste is an organic binder chosen based on factors such as the ability to bind to the inorganic material of the slurry or paste, the ability to be cured or otherwise hardened to retain a molded microstructure, the ability to adhere to the patterned substrate, and the ability to volatilize (or burn out) at temperatures at least somewhat lower than those used for firing the green state microstructures. The binder helps bind together the particles of the inorganic material when the binder is cured or hardened so that the mold can be removed to leave rigid green state microstructures adhered to and aligned with the patterned substrate. The binder can be referred to as a "fugitive binder" because, if desired, the binder material can be burned out of the microstructures at elevated temperatures prior to fusing or sintering the ceramic material in the microstructures. Preferably, firing substantially completely burns out the fugitive binder so that the microstructures left on the patterned surface of the substrate are fused ceramic microstructures that are substantially free of carbon residue. In applications where the microstructures used are dielectric barriers, such as in PDPs, the binder is preferably a material capable of debinding at a temperature at least somewhat below the temperature desired for firing without leaving behind a significant amount of carbon that can degrade the dielectric properties of the microstructured barriers. For example, binder materials containing a significant proportion of aromatic hydrocarbons, such as phenolic resin materials, can leave graphitic carbon particles during debinding that can require significantly higher temperatures to completely remove.

The binder is preferably an organic material that is radiation or heat curable. Preferred classes of materials include acrylates and epoxies. Alternatively, the binder can be a thermoplastic material that is heated to a liquid state to conform to the mold and then cooled to a hardened state to form microstructures adhered to the substrate. When precise placement and alignment of the microstructures on the substrate is desired, it is preferable that the binder is radiation curable so that the binder can be hardened under isothermal conditions. Under isothermal conditions (no change in temperature), the mold, and therefore the slurry or paste in the mold, can be held in a fixed position relative to the pattern of the substrate during hardening of the binder material. This reduces the risk of shifting or expansion of the mold or the substrate, especially due to differential thermal expansion characteristics of the mold and the substrate, so that precise placement and alignment of the mold can be maintained as the slurry or paste is hardened.

When using a binder that is radiation curable, it is preferable to use a cure initiator that is activated by radiation to which the substrate is substantially transparent so that the slurry or paste can be cured by exposure through the substrate. For example, when the substrate is glass, the binder is preferably visible light curable. By curing the binder through the substrate, the slurry or paste adheres to the substrate first, and any shrinkage of the binder material during curing will tend to occur away from the mold and toward the surface of the substrate. This helps the microstructures demold and helps maintain the location and accuracy of the microstructure placement on the pattern of the substrate.

In addition, the selection of a cure initiator can depend on what materials are used for the ceramic material of the slurry or paste. For example, in applications where it is desirable to form ceramic microstructures that are opaque and diffusely reflective, it can be advantageous to include a certain amount of titania ($TiO_2$) in the ceramic material of the slurry or paste. While titania can be useful for increasing the reflectivity of the microstructures, it can also make curing with visible light difficult because visible light reflection by the titania in the slurry or paste can prevent sufficient absorption of the light by the cure initiator to effectively cure the binder. However, by selecting a cure initiator that is activated by radiation that can simultaneously propagate through the substrate and the titania particles, effective curing of the binder can take place. One example of such a cure initiator is bis(2,4,6-trimethylbenzoyl)-phenylphosphineoxide, a photoinitiator commercially available from Ciba Specialty Chemicals, Hawthrone, N.Y., under the trade designation Irgacure™ 819. Another example is a ternary photoinitiator system, as described in U.S. Pat. No. 5,545,670, incorporated herein by reference, including, for example, a mixture of ethyl dimethylaminobenzoate, camphoroquinone, and diphenyl iodonium hexafluorophosphate. Both of these examples are active in the blue region of the visible spectrum near the edge of the ultraviolet in a relatively narrow region where the radiation can penetrate both a glass substrate and titania particles in the slurry or paste. Other cure systems can be selected for use in the process of the present invention based on, for example, the binder, the components of the inorganic material in the slurry or paste, and the material of the mold or the substrate through which curing is to take place.

The diluent of the slurry or paste is generally a material selected based on factors such as, for example, the ability to enhance mold release properties of the slurry subsequent to curing the fugitive binder and the ability to enhance debinding properties of green state structures made using the slurry or paste. The diluent is preferably a material that is soluble in the binder prior to curing and remains liquid after curing the binder. By remaining a liquid when the binder is hardened, the diluent reduces the risk of the cured binder material adhering to the mold. Further, by remaining a liquid when the binder is hardened, the diluent phase separates from the binder material, thereby forming an interpenetrating network of small pockets, or droplets, of diluent dispersed throughout the cured binder matrix.

Various organic diluents can be employed depending on the choice of curable organic binder. In general suitable diluents include various alcohols and glycols such as alkylene glycol (e.g. ethylene glycol, propylene glycol, tripropylene glycol), alkyl diol (e.g. 1,3 butanediol,), and alkoxy alcohol (e.g. 2-hexyloxyethanol, 2-(2-hexyloxy)ethanol, 2-ethylhexyloxyethanol); ethers such as dialkylene glycol alkyl ethers (e.g. diethylene glycol monoethyl ether, dipropylene glycol monopropyl ether, tripropylene glycol monomethyl ether); esters such as lactates and acetates and in particular dialkyl glycol alkyl ether acetates (e.g. diethylene glycol monoethyl ether acetate); alkyl succinate (e.g. diethyl succinate), alkyl glutarate (e.g. diethyle glutarate), and alkyl adipate (e.g. diethyl adipate).

For many applications, such as PDP barrier ribs, it is desirable for debinding of the green state microstructures to be substantially complete before firing. Additionally, debinding is often the longest and highest temperature step in thermal processing. Thus, it is desirable for the slurry or paste to be capable of debinding relatively quickly and completely and at a relatively low temperature.

While not wishing to be bound by any theory, debinding can be thought of as being kinetically and thermodynamically limited by two temperature-dependent processes, namely diffusion and volatilization. Volatilization is the process by which decomposed binder molecules evaporate from a surface of the green state structures and thus leave a porous network for egress to proceed in a less obstructed manner. In a single-phase resin binder, internally trapped gaseous degradation products can blister and/or rupture the structure. This is more prevalent in binder systems that leave a high level of carbonaceous degradation products at the surface that can form an impervious skin layer to stop the egress of binder degradation gases. In some cases where single-phase binders are successful, the cross sectional area is relatively small and the binder degradation heating rate is sufficiently long to prevent a skin layer from forming.

The rate at which volatilization occurs depends on temperature, an activation energy for volatilization, and a frequency or sampling rate. Because volatilization occurs primarily at or near surfaces, the sampling rate is typically proportional to the total surface area of the structures. Diffusion is the process by which binder molecules migrate to surfaces from the bulk of the structures. Due to volatilization of binder material from the surfaces, there is a concentration gradient which tends to drive binder material toward the surfaces where there is a lower concentration. The rate of diffusion depends on, for example, temperature, an activation energy for diffusion, and a concentration.

Because volatilization is limited by the surface area, if the surface area is small relative to the bulk of the microstructures, heating too quickly can cause volatile species to be trapped. When the internal pressure gets large enough, the structures can bloat, break or fracture. To curtail this effect, debinding can be accomplished by a relatively gradual increase in temperature until debinding is complete. A lack of open channels for debinding, or debinding too quickly, can also lead to a higher tendency for residual carbon formation. This in turn may necessitate higher debinding temperatures to ensure substantially complete debinding. When debinding is complete, the temperature can be ramped up more quickly to the firing temperature and held at that temperature until firing is complete. At this point, the articles can then be cooled.

The diluent enhances debinding by providing shorter pathways for diffusion and increased surface area. The diluent preferably remains a liquid and phase separates from the binder when the binder is cured or otherwise hardened. This creates an interpenetrating network of pockets of diluent dispersed in a matrix of hardened binder material. The faster that curing or hardening of the binder material occurs, the smaller the pockets of diluent will be. Preferably, after hardening the binder, a relatively large amount of relatively small pockets of diluent are dispersed in a network throughout the green state structures. During debinding, the low molecular weight diluent can evaporate quickly at relatively low temperatures prior to decomposition of the other high molecular weight organic components. Evaporation of the diluent leaves behind a somewhat porous structure, thereby increasing the surface area from which remaining binder material can volatilize and decreasing the mean path length over which binder material must diffuse to reach these surfaces. Therefore, by including the diluent, the rate of volatilization during binder decomposition is increased by increasing the available surface area, thereby increasing the rate of volatilization for the same temperatures. This makes pressure build up due to limited diffusion rates less likely to occur. Furthermore, the relatively porous structure allows pressures that are built up to be released easier and at lower thresholds. The result is that debinding can typically be performed at a faster rate of temperature increase while lessening the risk of microstructure breakage. In addition, because of the increased surface area and decreased diffusion length, debinding is complete at a lower temperature.

The diluent is not simply a solvent compound for the binder. The diluent is preferably soluble enough to be incorporated into the binder in the uncured state. Upon curing of the binder of the slurry or paste, the diluent should phase separate from the monomers and/or oligomers participating in the cross-linking process. Preferably, the diluent phase separates to form discrete pockets of liquid material in a continuous matrix of cured binder, with the cured binder binding the particles of the glass frit or ceramic material of the slurry or paste. In this way, the physical integrity of the cured green state microstructures is not greatly compromised even when appreciably high levels of diluent are used (i.e., greater than about a 1:3 diluent to resin ratio).

Preferably the diluent has a lower affinity for bonding with the inorganic material of the slurry or paste than the affinity for bonding of the binder with the inorganic material. When hardened, the binder should bond with the particles of the inorganic material. This increases the structural integrity of the green state structures, especially after evaporation of the diluent. Other desired properties for the diluent will depend on the choice of inorganic material, the choice of binder material, the choice of cure initiator (if any), the choice of the substrate, and other additives (if any). Preferred classes of diluents include glycols and polyhydroxyls, examples of which include butanediols, ethylene glycols, and other polyols.

In addition to inorganic powder, binder, and diluent, the slurry or paste can optionally include other materials. For example, the slurry or paste can include an adhesion promoter to promote adhesion to the substrate. For glass substrates, or other substrates having silicon oxide or metal oxide surfaces, a silane coupling agent is a preferred choice as an adhesion promoter. A preferred silane coupling agent is a silane coupling agent having three alkoxy groups. Such a silane can optionally be pre-hydrolyzed for promoting better adhesion to glass substrates. A particularly preferred silane coupling agent is a silano primer such as sold by 3M Company, St. Paul, Minn. under the trade designation Scotchbond™ Ceramic Primer. Other optional additives can include materials such as dispersants that aid in mixing the inorganic material with the other components of the slurry or paste. Optional additives can also include surfactants, catalysts, anti-aging components, release enhancers, and so on.

Generally, the methods of the present invention typically use a mold to form the microstructures. The mold has two opposing major surfaces, at least one of which is a microstructured surface. The opposing surface is typically a generally planar, unstructured surface. The microstructured surface of the mold has a plurality of microstructures that represents the reverse structure of the microstructures to be formed and aligned on the patterned substrate. The mold typically comprises a flexible polymeric material in the form of a sheet or continuous roll. The aligned mold may correspond in size to a single plasma display panel (e.g. an areas from about 1 cm$^2$ to about 2 m$^2$) or be a portion of a sheet or roll. The mold can be made by compression molding of a thermoplastic material using a master tool that has a microstructured pattern. The mold can also be made of a curable material that is cast and cured onto a thin, flexible polymer film. The molds may have curved surfaces connecting the barrier regions and land regions such as described in U.S. Patent Application Publication No. 2003/0100192-A1. Further the material of the land portions may be continuous with the material of the barrier portions.

The microstructured mold can be formed, for example, according to a process like the processes disclosed in U.S. Pat. No. 5,175,030 (Lu et al.) and U.S. Pat. No. 5,183,597 (Lu), incorporated herein by reference. The formation process includes the following steps: (a) preparing an oligomeric resin composition; (b) depositing the oligomeric resin composition onto a master negative microstructured tooling surface in an amount barely sufficient to fill the cavities of the master; (c) filling the cavities by moving a bead of the composition between a preformed substrate and the master, at least one of which is flexible; and (d) curing the oligomeric composition.

The oligomeric resin composition of step (a) is preferably a one-part, solvent-free, radiation-polymerizable, crosslinkable, organic oligomeric composition, although other suitable materials can be used. The oligomeric composition is preferably one which is curable to form a flexible and dimensionally-stable cured polymer. The curing of the oligomeric resin preferably occurs with low shrinkage. One example of a suitable oligomeric composition is an aliphatic urethane acrylate such as one sold by the Henkel Corporation, Ambler, Pa., under the trade designation Photomer™ 6010. Similar compounds are available from other suppliers.

Acrylate and methacrylate functional monomers and oligomers are preferred because they polymerize more quickly under normal curing conditions. Further, a large variety of acrylate esters are commercially available. However, methacrylate, acrylamide and methacrylamide functional ingredients can also be used. Preferred oligomeric compositions comprise at least one acryl oligomer and at least one acryl monomer such as described in oligomeric resin compositions are described in PCT Publication No. WO2005/021260; PCT Publication No. WO2005/021260 and U.S. patent application Ser. No. 11/107,554, filed Apr. 15, 2005; each of which are incorporated herein by reference.

Polymerization can be accomplished by usual means, such as heating in the presence of free radical initiators, irradiation with ultraviolet or visible light in the presence of suitable photoinitiators, and irradiation with electron beam. One method of polymerization is by irradiation with ultraviolet or visible light in the presence of photoinitiator at a concentration of about 0.1 percent to about 1 percent by weight of the oligomeric composition. Higher concentrations can be used but are not normally needed to obtain the desired cured resin properties.

The viscosity of the oligomeric composition deposited in step (b) can be, for example, between 500 and 5000 centipoise (500 and 5000×10$^{-3}$ Pascal-seconds). If the oligomeric composition has a viscosity above this range, air bubbles might become entrapped in the composition. Additionally, the composition might not completely fill the cavities in the master tooling. For this reason, the resin can be heated to lower the viscosity into the desired range. When an oligomeric composition with a viscosity below that range is used, the oligomeric composition can experience shrinkage upon curing that prevents the oligomeric composition from accurately replicating the master.

Various materials can be used for the base (substrate) of the patterned mold. Typically the material is substantially optically clear to the curing radiation and has enough strength to allow handling during casting of the microstructure. In addition, the material used for the base can be chosen so that it has sufficient thermal stability during processing and use of the mold. Polyethylene terephthalate or polycarbonate films are preferable for use as a substrate in step (c) because the materials are economical, optically transparent to curing radiation, and have good tensile strength. Substrate thicknesses of 0.025 millimeters to 0.5 millimeters are preferred and thicknesses of 0.075 millimeters to 0.175 millimeters are especially preferred. Other useful substrates for the microstructured mold include cellulose acetate butyrate, cellulose acetate propionate, polyether sulfone, polymethyl methacrylate, polyurethane, polyester, and polyvinyl chloride. The surface of the substrate may also be treated to promote adhesion to the oligomeric composition.

Examples of suitable polyethylene terephthalate based materials include: photograde polyethylene terephthalate; and polyethylene terephthalate (PET) having a surface that is formed according to the method described in U.S. Pat. No. 4,340,276, incorporated herein by reference.

A preferred master for use with the above-described method is a metallic tool. If the temperature of the curing and optional simultaneous heat treating step is not too great, the master can also be constructed from a thermoplastic material, such as a laminate of polyethylene and polypropylene.

After the oligomeric resin fills the cavities between the substrate and the master, the oligomeric resin is cured, removed from the master, and may or may not be heat treated to relieve any residual stresses. When curing of the mold resin material results in shrinkage of greater than about 5% (e.g., when a resin having a substantial portion of monomer or low molecular weight oligomers is used), it has been observed that the resulting microstructures may be distorted. The distortion that occurs is typically evidenced by concave microstructure sidewalls or slanted tops on features of the microstructures. Although these low viscosity resins perform well for replication of small, low aspect ratio microstructures, they are not preferred for relatively high aspect ratio microstructures for which the sidewall angles and the top flatness should be maintained. In forming barrier ribs for PDP applications, relatively high aspect ratio ribs are desired, and the maintenance of relatively straight sidewalls and tops on the barrier ribs can be important.

The mold can alternatively be replicated by compression molding a suitable thermoplastic against the master metal tool.

Various other aspects that may be utilized in the invention described herein are known in the art including, but not limited to each of the following patents that are incorporated herein by reference: U.S. Pat. Nos. 6,247,986; 6,537,645; 6,713,526; 6,843,952, 6,306,948; WO 99/60446; WO 2004/062870; WO 2004/007166; WO 03/032354; US2003/0098528; WO 2004/010452; WO 2004/064104; U.S. Pat. Nos. 6,761,607; 6,821,178; WO 2004/043664; WO 2004/062870; PCT Application No. US2005/0093202; PCT No. WO2005/019934; PCT No. WO2005/021260; PCT No. WO2005/013308; PCT No. WO2005/052974; PCT No. US04/43471 filed Dec. 22, 2004; U.S. Patent Applications Ser. Nos. 60/604556, 60/604557, 60/604558 and 60/604559, each filed Aug. 26, 2004.

Advantages of the invention are further illustrated by the following examples, but the particular materials and amounts thereof recited in the examples, as well as other conditions and details, should not be construed to unduly limit the invention. All percentages and ratios herein are by weight unless otherwise specified.

EXAMPLES

A glass frit slurry formulation suitable for use in these examples includes 80 parts by weight RFW030 glass powder (Asahi Glass Co., Tokyo, Japan) that contains lead borosilicate glass frit with refractory fillers such as $TiO_2$ and $Al_2O_3$. To the glass powder is added 8.034 parts by weight BisGMA (bisphenol-a diglycidyl ether dimethacrylate), available form Sartomer Company, Inc., Exton, Pa., and 4.326 parts by weight TEGDMA (triethylene glycol dimethacrylate), available from Kyoeisha Chemical Co., Ltd., Japan, to form the curable fugitive binder. As a diluent, 7 parts by weight of 1,3 butanediol (Aldrich Chemical Co., Milwaukee, Wis.) is used. In addition, 0.12 parts by weight POCAII (phosphate polyoxyalkyl polyol), available from 3M Company, St. Paul, Minn. (other phosphate polyoxyalkyl polyols can be used and are available from other manufacturers) is added as a dispersant, 0.16 parts by weight A174 Silane (Aldrich Chemical Co., Milwaukee, Wis.) is added as a silane coupling agent, and 0.16 parts by weight Irgacur™ 819 (Ciba Specialty Chemicals, Basel, Switzerland) is added as the cure initiator. In additional, 0.20 parts BYK A555 from BYK Chemie USA, Wallingford, Conn. is added as a de-airing agent.

All liquid ingredients and the photo-initiator are combined in a stainless steel mixing container. The ingredients are blended using a cowles blade (VWR Scientific Products, West Chester, Pa.) driven by a pneumatic motor. With the mixing blade running, the solid ingredients are slowly added. After all the ingredients are incorporated, the mixture was blended for an additional 5 minutes. The slurry is transfered to a high-density polyethylene container charged with ½ inch cylindrical high density aluminum oxide milling media. Milling is performed using a paint conditioner (Red Devil Model 5100, Union, N.J.) for 30 minutes. The slurry is then drained from the ball mill. Finally, the slurry is milled using a 3-roll mill (Model 2.5×5 TRM, Charles Ross & Son Company, Haupauge, N.Y.) at 60° C.

Example 1

Figure 3:
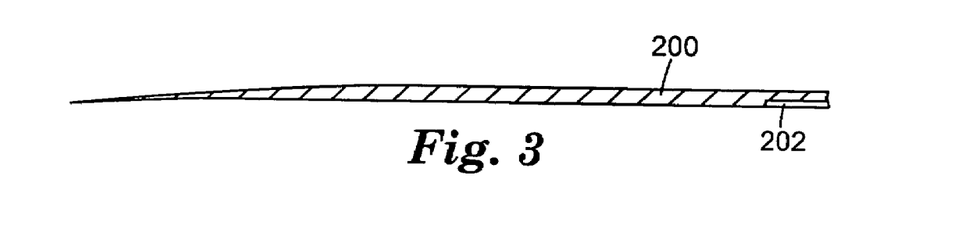
FIG. 3 is a representative cross sectional view of the template of FIG. 2 through line 3-3.

A template is molded from polypropylene. The template is 1.25 m wide by 2.30 m long. The template has four openings that are 523 mm by 930 mm, appropriately sized to produce four 42" plasma display panels. The template is molded so that it tapers from a thin edge 20μ thick at the peripheral edges of the four openings to a thickness of 500μ in the areas more than 25 mm from an opening. The template is designed so that the tapered 25 mm regions protrude downward from the rest of the template reaching a distance of 100μ below the nominal bottom surface of the template. The template is designed with long grooves on the bottom surface of the template in the regions 50 mm away from the openings, as depicted in FIG. 3. This allows for air movement to prevent bubbles under the template and to prevent the template from being stuck to the substrate by vacuum. Clamping bars that are at least 1.25 m long hold two opposing edges of the template as depicted in FIG. 2.

The substrate is a large piece of glass in the range of 1.25 m by 2.30 m. Four regions on the substrate have been patterned with electrodes for a plasma display panels. The substrate is moved into position in a laminating area by a part handling system while the template is positioned away from the surface. This may be transport belts, a pick and place device, human operators, or a robot. The laminating area has a flat granite surface. The template is then moved above the glass by the vertical positioning system. A vision feedback system locates fiducials on the glass and locates edges of the openings in the template and functions as feedback for the servomotors to position the template so the openings are aligned with the electrodes on the glass. The clamping bars are lowered so the template makes contact with the substrate.

A conventional large area extrusion die coating system that has been integrated with the system then coats a layer of slurry across just less than the peripheral outer edges of the entire template. This produces a uniform coating in at least the four open regions with all edge effects residing on the template.

The clamping bars are then raised lifting the template with the excess slurry on it so that its lowest point is 10 mm above the top of the remaining slurry. While the template is rising, the thin moveable plate is moved under the template to help separate the template from the glass panel, and prevent slurry from dripping onto the glass panel. The template is then moved away from the substrate by the large range positioning system. The substrate now has four distinct patches of slurry aligned on the electrodes.

The template will be scraped by vacuum wipers that remove the excess slurry from the template and return the excess slurry to a reservoir for reuse. This preferably occurs while the next substrate is moved into position on the granite surface.

Four separate mold tools having a molding surface suitable for molding barrier ribs may be pressed into the slurry such that the electrodes of the substrates are aligned with the barrier ribs of the mold. After molding, the coated substrate is exposed to a blue light source to harden the glass frit slurry. Curing is performed using a blue light source at 1.5 inch (about 3.8 cm) sample surface. The light source is constructed from 10 super-actinic fluorescent lamps (Model TLDK 30W/03, Philips Electronics N.V., Einhoven, Netherlands) spaced at 2 inches (about 5.1 cm) apart. These superactinic lamps provide light in a wavelength range of about 400 to 500 nm. Curing time is typically 30 seconds.

The four mold tools are then removed. The substrate having the four molded regions is moved away from the granite surface by a part handling system. The glass substrate with cured structures will then be sintered in air according to the following thermal cycle: 3° C./min to 300° C., 5° C./min to 560° C., soak for 20 minutes, and cooled at 2-3° C./min to ambient.

Example 2

Example 1 can be repeated with the following exceptions: The template is formed from polytetrafluoroethylene such as commercially available from Dupont under the trade designation "Teflon" to enhance removal of cured slurry. The peripheral edges of the mold tool outside of the barrier rib structured regions have pointed edges to cut into the slurry. The edges may be sharp or flat, continuous or serrated. A region at least consisting of all the mold tools is then exposed to radiation to cure the slurry. The mold tools are removed after such curing of the slurry. The clamping bars are then raised lifting the template with the excess slurry on it so that its lowest point is 10 mm above the top of the remaining slurry. The cured slurry will break preferentially at the scored lines created by the edges of the mold tools. The template is then moved away from the substrate by the large range positioning system. The substrate is moved away from the granite surface by a part handling system. The slurry is sintered in an oven.

What is claimed is:

1. A method of making barrier ribs for a display panel comprising:
    providing a transfer sheet and a mold having a microstructured surface suitable for making barrier ribs;
    disposing a template having at least one opening on the transfer sheet;
    dispensing a curable inorganic paste in at least each opening;
    removing the template forming at least one discrete coating of inorganic paste;
    contacting an exposed surface of the coating to a glass substrate and removing the transfer sheet such that the discrete coating of inorganic paste is transferred onto the glass substrate;
    contacting the discrete coating of inorganic paste with the mold such that inorganic paste is disposed between the microstructured surface of the mold and the glass substrate; and
    curing the inorganic paste.

2. The method of claim 1 wherein each opening has dimensions corresponding to a single plasma display panel.

3. The method of claim 1 wherein each opening has an area ranging from about 1 cm$^2$ to about 2 m$^2$.

4. The method of claim 1 wherein the template has two or more openings.

5. The method of claim 1 wherein the barrier ribs have a height and the template has a thickness substantially equal to the height of the baffler ribs or the barrier ribs in combination with a land layer have a height and the template has a thickness substantially equal to the height of the barrier ribs and land layer.

6. The method of claim 1 wherein the mold is transparent and the inorganic paste is cured through the mold.

7. The method of claim 1 wherein the mold is flexible.

8. The method of claim 1 wherein the curable inorganic paste is dispensed by means of coating substantially the entire template or by means of coating discrete areas slightly larger than each opening.

9. The method of claim 1 wherein the glass substrate is a glass sheet having patterned electrodes.

10. The method of claim 1 wherein the transfer sheet comprises a flexible film and a rigid support layer.

11. The method of claim 10 wherein the flexible film is removed concurrently with removing the rigid support layer.

12. The method of claim 1 wherein the opening in the template has fixed dimensions or is adjustable such that the dimensions can be changed.

13. The method of claim 1 wherein the template comprises an assembly of two or more discrete pieces or a first template disposed over a second template.

14. The method of claim 1 wherein the template has a thickness of less than 50 microns at least at the peripheral edges of the opening.

15. The method of claim 1 wherein the template, the mold, or a combination thereof has edge portions that create a score line in the cured inorganic paste.

16. A method of making a microstructured article comprising:
    providing a transfer sheet and a mold having a microstructured surface;
    disposing a template having at least one opening on the transfer sheet;
    dispensing a curable material in at least each opening;
    removing the template forming at least one discrete coating of curable material;
    contacting an exposed surface of the coating to a substrate and removing the transfer sheet such that the discrete coating of inorganic paste is transferred onto the substrate;
    contacting the discrete coating with the microstructured surface of the mold such that the curable material is disposed between the mold and the substrate; and
    curing the curable material.

17. The method of claim 1 wherein the template has two or more openings.

18. The method of claim 16 wherein the opening in the template has fixed dimensions or is adjustable such that the dimensions can be changed.

19. The method of claim 16 wherein the template comprises an assembly of two or more discrete pieces or a first template disposed over a second template.

20. The method of claim 1 wherein the template, the mold, or a combination thereof has edge portions that create a score line in the cured inorganic paste.

* * * * *

UNITED STATES PATENT AND TRADEMARK OFFICE
CERTIFICATE OF CORRECTION

PATENT NO.        : 7,670,543 B2                                              Page 1 of 1
APPLICATION NO.   : 11/203908
DATED             : March 2, 2010
INVENTOR(S)       : Thomas R. Corrigan It is certified that error appears in the above-identified patent and that said Letters Patent is hereby corrected as shown below:

Column 16
Line 60, In Claim 5, delete "baffler" and insert -- barrier --, therefor.

Signed and Sealed this

Twenty-second Day of June, 2010

David J. Kappos
*Director of the United States Patent and Trademark Office*